(12) United States Patent
Smith

(10) Patent No.: US 9,840,903 B2
(45) Date of Patent: Dec. 12, 2017

(54) OIL RECOVERY PROCESS INCLUDING TREATING PERMEATE FROM A CERAMIC MEMBRANE TO ENHANCE OIL RECOVERY

(71) Applicant: Veolia Water Solutions & Technologies North America, Inc., Moon Township, PA (US)

(72) Inventor: Stanton R. Smith, Belmont, MA (US)

(73) Assignee: Veolia Water Technologies, Inc., Moon Township, PA (US)

(*) Notice: Subject to any disclaimer, the term of this patent is extended or adjusted under 35 U.S.C. 154(b) by 720 days.

(21) Appl. No.: 14/203,607

(22) Filed: Mar. 11, 2014

(65) Prior Publication Data

US 2014/0262254 A1 Sep. 18, 2014

Related U.S. Application Data

(60) Provisional application No. 61/788,071, filed on Mar. 15, 2013.

(51) Int. Cl.
*E21B 43/40* (2006.01)
*C02F 9/00* (2006.01)
(Continued)

(52) U.S. Cl.
CPC ............. *E21B 43/40* (2013.01); *B09C 1/002* (2013.01); *C02F 9/00* (2013.01); *C09K 8/584* (2013.01);
(Continued)

(58) Field of Classification Search
CPC ...... E21B 21/06; E21B 21/063; E21B 21/065; E21B 21/068; E21B 43/34; E21B 43/40;
(Continued)

(56) References Cited

U.S. PATENT DOCUMENTS 5,247,993 A * 9/1993 Sarem ...................... C09K 8/58
166/303
5,855,243 A * 1/1999 Bragg ...................... C09K 8/26
166/275
(Continued)

FOREIGN PATENT DOCUMENTS

CN 201880422 U 6/2011
CN 102225812 A 10/2011
(Continued)

OTHER PUBLICATIONS

Crittenden, John C., et al., Water Treatment: Principles and Design, p. 1012 (John Wiley & Sons, Inc., 2005).
(Continued)

*Primary Examiner* — Joseph Drodge
(74) *Attorney, Agent, or Firm* — Coats & Bennett, PLLC

(57) ABSTRACT

A process for recovering oil is provided. The process entails recovering an oil-water mixture from an oil-bearing formation. Next, the process entails separating oil from the oil-water mixture and producing produced water having hardness and other scale-forming compounds, suspended solids, free oil and emulsified oil. A pre-treatment process is undertaken to remove hardness and other scale-forming compounds. This entails precipitating hardness and other scale-forming compounds. After the precipitation of hardness and other scale-forming compounds, the produced water is directed to a membrane separation unit for filtering the produced water and producing a retentate having suspended solids, hardness and other scale-forming compounds, free oil and emulsified oil. The membrane separation unit also produces a permeate stream substantially free of hardness and other scale-forming compounds, suspended solids, free oil and emulsified oil. Thereafter, the permeate stream is chemically treated to enhance the recovery of oil in the oil-bearing formation. After treating the permeate stream
(Continued)

from the membrane separation unit, the treated permeate is injected into the oil-bearing formation.

28 Claims, 1 Drawing Sheet

(51) Int. Cl.

| | | |
|---|---|---|
| *C09K 8/58* | (2006.01) | |
| *C02F 1/04* | (2006.01) | |
| *C02F 1/42* | (2006.01) | |
| *C02F 1/44* | (2006.01) | |
| *C02F 1/66* | (2006.01) | |
| *B09C 1/00* | (2006.01) | |
| *C09K 8/584* | (2006.01) | |
| *C09K 8/588* | (2006.01) | |
| *C02F 1/28* | (2006.01) | |
| *C02F 5/06* | (2006.01) | |
| *C02F 101/32* | (2006.01) | |
| *C02F 103/10* | (2006.01) | |

(52) U.S. Cl.
CPC .............. *C09K 8/588* (2013.01); *C02F 1/04* (2013.01); *C02F 1/28* (2013.01); *C02F 1/42* (2013.01); *C02F 1/441* (2013.01); *C02F 1/444* (2013.01); *C02F 1/66* (2013.01); *C02F 5/06* (2013.01); *C02F 2101/32* (2013.01); *C02F 2103/10* (2013.01)

(58) Field of Classification Search
CPC ....... E21B 21/062; C09K 8/584; C09K 8/588; C09K 8/58; C09K 8/60; C09K 8/602; C09K 8/62; C09K 8/64; C09K 8/664; C09K 8/84; C09K 8/86; C09K 8/88; C09K 8/882; C09K 8/885; C09K 8/887; C09K 8/04; C09K 8/26; C09K 8/265; C09K 8/28; C09K 8/32; C09K 8/34; C09K 8/36; C09K 8/592; C02F 1/42; C02F 1/441; C02F 1/66; C02F 5/06; C02F 2101/32; C02F 1/444; C02F 1/28; C02F 2103/10; C02F 1/04; C02F 1/52; C02F 9/00; C02F 1/40; B09C 1/002; B01D 61/02; B01D 61/04; B01D 61/14; B01D 61/16; B01D 2311/04; B01D 2311/06; B01D 2311/26; B01D 2311/2623; B01D 2311/2642; B01D 17/04; B01D 17/041; B01D 17/042; B01D 17/044; B01D 17/045; B01D 17/047; B01D 17/048
USPC ....... 210/663, 669, 650, 651, 652, 702, 804, 210/806; 507/935, 936; 166/266, 267, 166/369
See application file for complete search history.

(56) References Cited

U.S. PATENT DOCUMENTS

| | | | |
|---|---|---|---|
| 7,597,144 B2 | 10/2009 | Minnich et al. | |
| 7,815,804 B2* | 10/2010 | Nagghappan | C02F 9/00 166/267 |
| 2009/0281003 A1 | 11/2009 | Shahin et al. | |
| 2009/0308609 A1* | 12/2009 | Curole | E21B 43/20 166/275 |
| 2010/0078168 A1* | 4/2010 | Jackson | C09K 8/588 166/270.1 |
| 2010/0243246 A1* | 9/2010 | Ayirala | E21B 43/20 166/266 |
| 2012/0227975 A1* | 9/2012 | Ayirala | E21B 43/20 166/344 |
| 2012/0255904 A1 | 10/2012 | Nagghappan | |
| 2012/0325744 A1 | 12/2012 | Polizzotti et al. | |
| 2013/0075098 A1* | 3/2013 | Janjua | E21B 43/40 166/303 |
| 2013/0192836 A1* | 8/2013 | Heng | C02F 9/00 166/305.1 |

FOREIGN PATENT DOCUMENTS

| | | |
|---|---|---|
| CN | 102774928 A | 11/2012 |
| CN | 102874967 A | 1/2013 |
| WO | 2012142204 A2 | 10/2012 |

OTHER PUBLICATIONS

Guerra, Katie, et al., Impact of operating conditions on permeate flux and process economics for cross flow ceramic membrane ultrafiltration of surface water, Separation and Purification Technology, vol. 87, pp. 47-53 (2012).

Kim, et al., The effects of pretreatment on nanofiltration and reverse osmosis membrane filtration for desalination of oil sands process-affected water, Separation and Purification Technology, vol. 81, pp. 418-428 (2011).

* cited by examiner

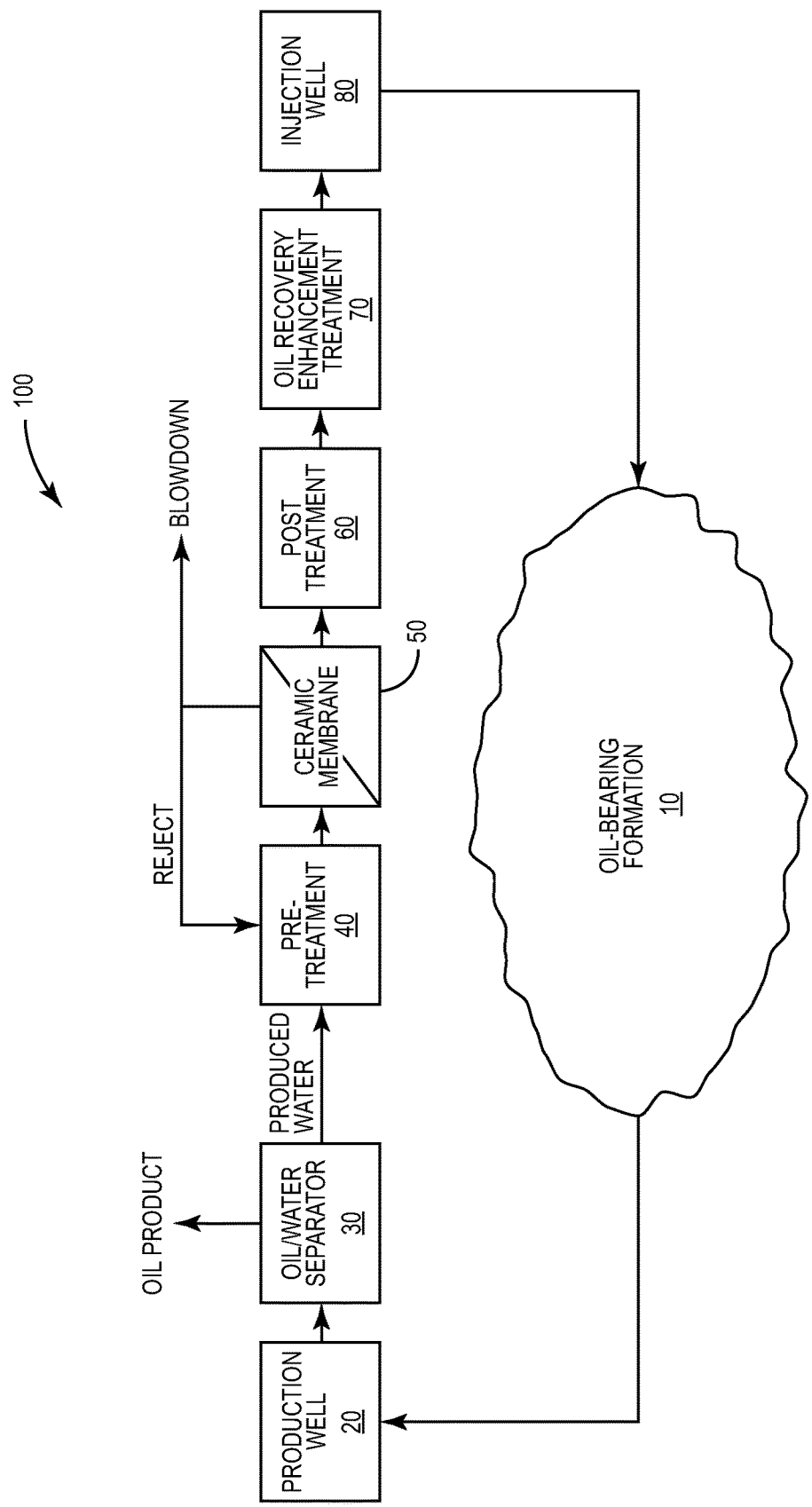

OIL RECOVERY PROCESS INCLUDING TREATING PERMEATE FROM A CERAMIC MEMBRANE TO ENHANCE OIL RECOVERY

Applicant claims priority based on U.S. Provisional Patent Application No. 61/788,071 filed Mar. 15, 2013. The subject matter of this application is incorporated herein by reference.

FIELD OF THE INVENTION

The present invention relates to oil recovery processes and more particularly to oil recovery and related treatment processes that utilize ceramic membranes.

BACKGROUND OF THE INVENTION

Significant portions of known oil reserves are bound in formations requiring enhanced oil recovery (EOR) techniques for effective and efficient extraction. Such reserves exist in previously untapped fields as well as in fields where traditional oil recovery has reached a practical limit. Among EOR techniques are steam-driven removal, typical of which is the so-called Steam-Assisted Gravity Discharge (SAGD) technique, and non-steam driven approaches. Non-steam driven approaches include water flooding to wash oil from oil-bearing formations by injecting large volumes of water into the formations and extracting the resulting oil-water mixture topside for processing. Generally, even after such EOR techniques as water flooding have been used on a field at least 40% of the Original Oil in Place (OOIP) remains in the formation.

Chemical flooding, another non-steam driven technique, has been found useful in extracting additional oil after other techniques have reached their practical limits as well as in some virgin fields. Practical limits often are based on limited water supply. While chemical flooding utilizes water, the chemical treatments reduce water requirements while increasing recovery of oil. Chemicals used for such treatments include polymers, surfactants, and alkali. While these chemicals may be used separately in aqueous solutions, considerable experience has developed in using them in combination in aqueous solutions. Such combination treatments are sometimes referred to as Alkali-Surfactant-Polymer (ASP) treatments or sometimes Alkali-Polymer (AP) treatments. For some fields, such treatments have been observed to result in an additional 15% to 30% extraction of the OOIP in the formation.

The oil-water mixture extracted from the chemically flooded formation is processed to separate the oil the oil-water mixture to produce an oil product stream and a produced water stream. Just as in other water-based EOR processes, reuse of the produced water is desirable. However, the total suspended solids (TSS), hardness and other scale formers, and residual oil and grease in the produced water present challenges in recycling the water. Scaling of infrastructure and well pore plugging concerns make it advantageous to effectively remove TSS, often desirable to sizes below 1 micron, hardness and other scale formers, and residual oil and grease from the produced water before reusing the water. A particular challenge in treating EOR produced waters is the fact that much of the oil contaminants are in emulsified form. Emulsified oil droplets typically range from 0.5 and 20 micron in size and differ from less challenging free floating oil with droplets size typically>100 micron and dispersed phase oil with droplet size typically 20 to 100 micron. Free floating and dispersed phase oil droplets can largely be removed by gravity separation such as skimming and gas floatation techniques, but emulsified oils often require more complex conventional treatment that often still results in poor effluent quality. There exists a need for improved approaches to cleaning produced water in chemical flooding EOR operations.

SUMMARY OF THE INVENTION

In one embodiment, the process of the present invention entails recovering an oil-water mixture from an oil-bearing formation. The oil-water mixture is subjected to an oil-water separation process that separates oil from the oil-water mixture, and yields produced water. Thereafter, the produced water is subjected to a pre-treatment process including the removal of hardness and other scale formers from the produced water. Optionally, other scale or fouling-forming species, such as sulfate, bicarbonate/carbonate, silica and other divalent ions, and organic compounds, such as hydrocarbon and aromatic hydrocarbons, can be removed. Thereafter, the produced water is directed into a ceramic membrane which filters the produced water and removes suspended solids, precipitated hardness and scale forming compounds, other precipitants, grease, free oil and emulsified oil. A permeate stream is produced by the ceramic membrane and this permeate stream is treated to form a re-injection stream for injection into the oil-bearing formation. The ceramic membrane permeate stream is treated to enhance oil recovery in the oil-bearing formation and, as a part of that treatment in one embodiment, the treatment enhances the ability of the re-injection water to emulsify oil in the oil-bearing formation. This enhances total oil recovery from the oil-bearing formation and since some of the resulting produced water from the CEOR operating that is filtered by the ceramic membrane will likely include emulsified oil, the ceramic membrane is effective to remove this emulsified oil prior to the permeate stream of the ceramic membrane being treated again to enhance oil recovery.

BRIEF DESCRIPTION OF THE DRAWINGS

FIGURE 1 is a schematic representation of the inventive process for enhancing oil recovery.

DETAILED DESCRIPTION

The present invention addresses enhanced oil recovery (EOR) from an oil-bearing geologic formation in an oil field. In particular, the present invention addresses EOR where chemical flooding of oil-bearing formations in employed. The methods disclosed entail improvements in processing produced water from chemical flooding EOR for reusing the water for enhanced oil recovery. Referring to the drawing, the process of the present invention is generally indicated by the numeral 100. Process 100 includes directing an oil-water mixture from a producing well 20 that is in fluid communication with an oil-bearing formation 10 as shown particularly in FIG. 1. Producing well 20 is drilled into or adjacent to oil-bearing formation 10. The oil-water mixture directed from producing well 20 is subjected to an oil-water separation step 30 from which product oil is withdrawn and produced water is generated. The produced water is directed to a pre-treatment step 40 which may include various sub-processes. Sub-processes included in pre-treatment step 40 may include hardness and scale former removal by lime softening and silica precipitation by magnesium oxide or magnesium chloride additions. As a part of removing hardness and other scale-forming compounds or other dissolved solids, the present invention could include, in one embodiment, a crystallization process. This is where certain chemical reagents, such as alkaline earth reagents, are mixed with the produced water, causing certain compounds to precipitate from the water. Through a mixing process in one or more reactors, these precipitants can be urged to crystallize and this will give rise to a crystallization process which is, in some situations, an efficient way of removing solids from the produced water.

Pre-treated produced water may then be directed to a membrane separation unit such as ceramic membrane system 50. Ceramic membrane 50 functions to remove suspended solids, precipitants generated in pre-treatment step 40, free oil and grease, and emulsified oil, some of which may be generated in enhanced oil recovery as discussed below. A permeate stream and reject stream, which comprises the removed material, are directed from ceramic membrane 50. A portion of the reject stream from ceramic membrane 50 may be recycled to pre-treatment step 40, and another portion of the reject stream may be wasted as blowndown or further treated.

The permeate stream from ceramic membrane 50 is generally free of suspended solids, free oil, emulsified oil and hardness and other scale formers. A ceramic membrane post-treatment step 60 that may include various purification sub-processes applied to the permeate stream from ceramic membrane 50. Sub-processes that may be employed in post-treatment step 60 include ion exchange softening, exposure to absorptive media, reverse osmosis, evaporation, nanofiltration, deaeration, and advanced oxidation among others. Sub-processes of post-treatment step 60 may be important in removing, for example, dissolved organic and inorganic matter, residual oxygen, the removal of which may be beneficial for water to be injected into certain kinds of formations.

Produced water is directed from post-treatment step 60 to a water enhancement step 70, where various enhancements may be performed as discussed below. The enhanced produced water is then directed into an injection well 80 and thence into oil-bearing formation 10 from whence an oil-water mixture is extracted via producing well 20.

Turning now to a more detailed description of water enhancement process 70, it is appreciated that enhancements provided in this step function in cooperation with ceramic membrane system 50 to increase oil recovery from the formation. Generally, the processes embodied in the schematic of FIG. 1 can be considered as oil recovery by chemically-amended water flooding, sometimes referred to simply as chemical flooding. Water flooding may be undertaken after other recovery operations have been completed and residual oil remains in the formation, or water flooding may be used as a primary recovery operation in some formations. In general, water flooding interacts within the formation to remove oil from the formation and mobilize the oil in an oil-water mixture for removal topside such as by ways of production well 20. Chemical flooding, while employing much of the infrastructure of water flooding, entails the addition of certain chemicals to the water to enhance or improve extraction of oil from the formation. Thus, various chemicals may be added to the produced water in the enhancement step 70, and these chemicals aid in various ways in the mobilization of the oil held in the formation and in mixing the oil with the water. Chemical flooding may also be used on fields for which other extraction techniques have reached their potential, or it may be used on virgin fields.

As discussed above, various chemicals may be used for chemical flooding. For example, polymeric compounds may be added to the water to enhance recovery by viscosity adjustment. Polymeric compounds added to the water tend to increase the viscosity of the water which improves the mobility ratio relative to oil recovery. Increased viscosity of the water may reduce viscous fingering, where thinner water and thicker oil result in "fingers" of water moving without entraining the oil in the flow of the water. Increasing the viscosity of the water to be injected reduces this "fingering" phenomenon and results in enhanced oil recovery from the formation. The polymer is typically added until its concentration in the produced water to be injected increases the viscosity up to the oil viscosity in the oil bearing formation. This tends to achieve a mobility ratio of closer to 1 to enable better sweep of the oil from the rock with the water by avoiding the fingering through the oil pockets. There may also be formation-related viscosity issues, such as permeability of the formation. Typically the oil-water mobility ratio is the controlling factor on the polymer addition when formation permeability ranges between about 50 mD and about 10,000 mD.

Compounds that elevate pH, alkali compounds for example, may also be added to the injection water to enhance oil recovery. Adding alkali can improve the wettability of some formations when flooded with such alkali-enhanced water. Mobilization of certain oils or crudes may be enhanced by saponification, or soap formation, enabled by the alkali. By Adding alkali, pH and salinity may also be adjusted, and chemical loss may be reduced due to alteration in rock chemistry. Alkali compounds are used based on an amount required to saponify the crude oil. Alkali dose rate then depends on the crude soap-formation characteristic. Soap formation leads to natural oil-in-water emulsion formation, which reduces the need for dosing with surfactants. As one example, napthanic crudes have a higher tendency to saponify, so more caustic, or alkali, and less surfactant may be used to emulsify these crudes. There are also certain formation characteristics that must be considered in determining alkali dose rates. For example, the pH increase due to alkali addition may often impact rock wettability and surfactant as well as polymer adsorption characteristics. Often hardness and other scale formers, and divalent ions lead to limitations on the effectiveness of the alkali because alkali will tend to precipitate the hardness and other scale-forming compounds, leading to TSS and formation plugging. The present invention, however, provides for removal of hardness, scale formers and divalent ions, which tends to obviate this concern. The lack of adequately softened injection water often, absent the present process, calls for using only polymer and surfactant addition to the injection. However the produced water softening and provision of high pH injection water afforded by the present invention addresses this issue in that there is improved rock surface chemistry control and less surfactant needed.

Additionally, direct surfactant compounds may be added in water enhancement step 70. Surfactants in the flood water also improve formation wettability, reduce oil-water interfacial tension as indicated above, and stimulate direct emulsification of the oil into a chemical oil and water emulsion. The surfactant dose and compound blend are determined based on the interfacial tension between the oil and water. Surfactant may be added to reduce the oil-water interfacial tension down to about 10 mN/m. Lower surface tension enables better contact and mixing between oil and water, and it ultimately generates oil-in-water emulsions which tend to mobilize most of the oil out of the formation. Additionally, surfactant attachment to the formation rocks must be discouraged, and the surfactant must withstand the salinity, temperature, hardness, scale formers and divalent ions to be effective. The present invention, in particular, is useful with regards to removal of hardness, scale formers and divalent ions. As discussed above, natural surfactant enhancement due to oil saponification stimulated by alkali addition may have impact on the amounts of additional chemical surfactants required.

The so-called alkali-surfactant-polymer (ASP) chemical flooding, as discussed above, combines alkali, surfactant, and polymer chemicals in water blends for chemical flooding. The proportions and strengths of the chemicals are dependent on characteristics of the geologic formation, and they may vary from formation to formation, being tuned to maximize extraction and to optimize extraction cost. Beyond those discussed above, further synergies also exist between ASP addition that improve control of surfactant adsorption on formation rock, enhance rock wettability control, stimulate natural emulsification of the oil, all of which may lead to reduced chemical consumption. Whatever the blend of chemicals utilized, such chemical flooding results in produced water having generally hardness, scale formers, total dissolved solids, residual enhancement chemicals, and residual oil and grease, which present a challenging stream to be treated for direct use to recycle as blend water.

The present invention, in one embodiment, applies the operational characteristics of ceramic membrane 50 in system 100 to remove precipitated hardness and other scale formers, suspended solids, free oil and grease and emulsified oil from the produced water. In this way, the produced water is generally oil-free and free of suspended matter that would otherwise present infrastructure scaling and plugging. Ceramic membrane 50 may advantageously be operationally more stable that more complicated alternatives. Stability of operation is important in that levels of residual oil and other contaminants may vary widely in typical EOR operations. Also, ceramic membrane 50 may be realizable in a relatively small footprint configuration, thus reducing space related costs.

Details of the ceramic membrane are not dealt with herein because such is not per se material to the present invention, and further, ceramic membranes are known in the art. For a review of general ceramic membrane technology, one is referred to the disclosures found in U.S. Pat. Nos. 6,165,553 and 5,611,931, the contents of which are expressly incorporated herein by reference. These ceramic membranes, useful in the processes disclosed herein, can be of various types. In some cases the ceramic membrane may be of the type that produces both a permeate stream and a continuously flowing reject stream. On the other hand, the ceramic membranes may be of the dead head type, which only produces a permeate stream and from time-to-time the retentate is backflushed or otherwise removed from the membrane.

The structure and materials of ceramic membranes as well as the flow characteristics of ceramic membranes varies. When ceramic membranes are used to purify produced water, the ceramic membranes are designed to withstand relatively high temperatures as it is not uncommon for the produced water being filtered by the ceramic membranes to have a temperature of approximately 90° C. or higher.

Ceramic membranes normally have an asymmetrical structure composed of at least two, mostly three, different porosity levels. Indeed, before applying the active, microporous top layer, an intermediate layer is formed with a pore size between that of the support and a microfiltration separation layer. The macroporous support ensures the mechanical resistance of the filter.

Ceramic membranes are often formed into an asymmetric, multi-channel element. These elements are grouped together in housings, and these membrane modules can withstand high temperatures, extreme acidity or alkalinity and high operating pressures, making them suitable for many applications where polymeric and other inorganic membranes cannot be used. Several membrane pore sizes are available to suit specific filtration needs covering microfiltration and ultrafiltration ranges.

Ceramic membranes today run the gamut of materials (from alpha alumina to zircon). The most common membranes are made of Al, Si, Ti or Zr oxides, with Ti and Zr oxides being more stable than Al or Si oxides. Silicon carbide (non-oxide) membranes are also gaining market presence. In some less frequent cases, Sn or Hf are used as base elements. Each oxide has a different surface charge in solution. Other membranes can be composed of mixed oxides of two of the previous elements, or are established by some additional compounds present in minor concentration. Low fouling polymeric coatings for ceramic membranes are also available.

Ceramic membranes are typically operated in the cross flow filtration mode. This mode has the benefit of maintaining a high filtration rate for membrane filters compared with the direct flow filtration mode of conventional filters. Cross flow filtration is a continuous process in which the feed stream flows parallel (tangential) to the membrane filtration surface and generates two outgoing streams.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An oil recovery process for recovering oil from an oil-bearing formation, comprising:
    recovering an oil-water mixture from the oil-bearing formation;
    separating oil from the oil-water mixture and producing produced water having hardness, suspended solids, free oil and emulsified oil;
    treating the produced water by precipitating hardness compounds from the produced water;
    directing the produced water to a ceramic membrane and filtering the produced water and producing a retentate having suspended solids, hardness compounds, free oil, and emulsified oil, and producing a permeate stream substantially free of hardness, suspended solids, free oil and emulsified oil;
    chemically treating the permeate stream from the ceramic membrane to enhance the recovery of oil in the oil-bearing formation; and
    after treating the permeate stream from the ceramic membrane unit, injecting the treated permeate stream into the oil-bearing formation, wherein chemically treating the permeate stream from the ceramic membrane results in the chemically treated permeate stream emulsifying oil in the oil-bearing formation and wherein at least a portion of the emulsified oil emulsified in the oil-bearing formation is removed from the produced water by the ceramic membrane.

2. The method of claim 1 including, after precipitating hardness from the produced water, directing the produced water to an ion exchange unit and further reducing the concentration of hardness in the produced water.

3. The method of claim 1 wherein chemically treating the permeate stream from the ceramic membrane comprises increasing the viscosity of the permeate stream produced by the ceramic membrane.

4. The method of claim 3 wherein the increasing the viscosity includes mixing a polymeric compound with the permeate stream from the ceramic membrane wherein the polymeric compound increases the viscosity of the permeate stream and reduces the "fingering" phenomena in the oil bearing formation.

5. The method of claim 4 wherein the mixing a polymeric compound includes adding a sufficient amount of a polymeric compound to the permeate stream from the ceramic membrane to increase the viscosity of the permeate stream to where the viscosity of the permeate stream generally equals the viscosity of the oil in the oil bearing formation.

6. The method of claim 3 wherein the increasing the viscosity includes increasing the viscosity of the permeate stream from the ceramic membrane sufficient to achieve a mobility ratio of approximately 1.

7. The method of claim 1 including mixing at least one alkali compound with the permeate stream produced by the ceramic membrane to improve the wettability of the oil bearing formation.

8. The method of claim 7 wherein the mixing at least one alkali compound with the permeate stream includes adding a sufficient amount of the alkali compound to the permeate stream of the ceramic membrane to saponify the oil in the oil bearing formation.

9. The method of claim 1 including mixing a surfactant with the permeate stream from the ceramic membrane to improve wettability of the oil bearing formation and reduce oil-water-interfacial tension and to stimulate emulsification of the oil in the oil bearing formation.

10. The method of claim 1 including mixing a surfactant with the permeate stream from the ceramic membrane wherein the surfactant, when injected into the oil bearing formation, promotes the generation of oil-water emulsions which mobilizes the oil in the oil bearing formation.

11. The method of claim 1 including mixing an alkali-surfactant-polymer with the permeate stream produced by the ceramic membrane.

12. The method of claim 1 further including, after filtering the produced water in the ceramic membrane, subjecting the permeate stream produced by the ceramic membrane to treatment in an ion exchange unit to further reduce the concentration of hardness in the permeate stream.

13. The method of claim 1 including mixing an alkaline earth reagent with the produced water upstream of the ceramic membrane and precipitating silica from the produced water; utilizing the ceramic membrane to remove the precipitated silica from the produced water.

14. The method of claim 1 including mixing a crystallizing reagent with the produced water upstream of the ceramic membrane to precipitate scale forming compounds from the produced water; and utilizing the ceramic membrane to remove the precipitated scale forming compounds from the produced water.

15. An oil recovery process for recovering oil from an oil-bearing formation, comprising:
    recovering an oil-water mixture from the oil-bearing formation;
    separating oil from the oil-water mixture and producing produced water having hardness, suspended solids, free oil and emulsified oil;
    directing the produced water to a membrane separation unit comprising a ceramic membrane and filtering the produced water in the membrane separation unit and producing a retentate having suspended solids, free oil, and emulsified oil, and producing a permeate stream substantially free of suspended solids, free oil and emulsified oil;
    chemically treating the permeate stream from the ceramic membrane to enhance the recovery of oil in the oil-bearing formation; and
    after treating the permeate stream from the membrane separation unit, injecting the treated permeate stream into the oil-bearing formation, wherein chemically treating the permeate stream from the ceramic membrane results in the chemically treated permeate stream emulsifying oil in the oil-bearing formation and wherein at least a portion of the emulsified oil emulsified in the oil-bearing formation is removed from the produced water by the ceramic membrane.

16. The method of claim 15 including, precipitating hardness from the produced water upstream of the membrane separation unit.

17. The method of claim 16 further including, after filtering the produced water in the membrane separation unit, subjecting the permeate stream produced by the membrane separation unit to treatment in an ion exchange unit to further reduce the concentration of hardness in the permeate stream.

18. The method of claim 15 wherein chemically treating the permeate stream from the ceramic membrane comprises increasing the viscosity of the permeate stream produced by the membrane separation unit.

19. The method of claim 18 wherein the increasing the viscosity includes mixing a polymeric compound with the permeate stream from the membrane separation unit wherein the polymeric compound increases the viscosity of the permeate stream and reduces the "fingering" phenomena in the oil bearing formation.

20. The method of claim 19 wherein the mixing a polymeric compound includes adding a sufficient amount of a polymeric compound to the permeate stream from the membrane separation unit to increase the viscosity of the permeate stream to where the viscosity of the permeate stream generally equals the viscosity of the oil in the oil bearing formation.

21. The method of claim 18 wherein the increasing the viscosity includes increasing the viscosity of the permeate stream from the ceramic membrane sufficient to achieve a mobility ratio of approximately 1.

22. The method of claim 15 including mixing at least one alkali compound with the permeate stream produced by the membrane separation unit to improve the wettability of the oil bearing formation.

23. The method of claim 22 wherein the mixing at least one alkali compound with the permeate stream includes adding a sufficient amount of the alkali compound to the permeate stream of the membrane separation unit to saponify the oil in the oil bearing formation.

24. The method of claim 15 including mixing a surfactant with the permeate stream from the membrane separation unit to improve wettability of the oil bearing formation and reduce oil-water-interfacial tension and to stimulate emulsification of the oil in the oil bearing formation.

25. The method of claim 15 including mixing a surfactant with the permeate stream from the membrane separation unit wherein the surfactant, when injected into the oil bearing formation, promotes the generation of oil-water emulsions which mobilizes the oil in the oil bearing formation.

26. The method of claim 15 including mixing an alkali-surfactant-polymer with the permeate stream produced by the membrane separation unit.

27. The method of claim 15 including mixing an alkaline earth reagent with the produced water upstream of the membrane separation unit and precipitating silica from the produced water; utilizing the membrane separation unit to remove the precipitated silica from the produced water.

28. The method of claim 15 including mixing a crystallizing reagent with the produced water upstream of the membrane separation unit to precipitate scale forming compounds from the produced water; and utilizing the membrane separation unit to remove the precipitated scale forming compounds from the produced water.

* * * * *